UNITED STATES PATENT OFFICE.

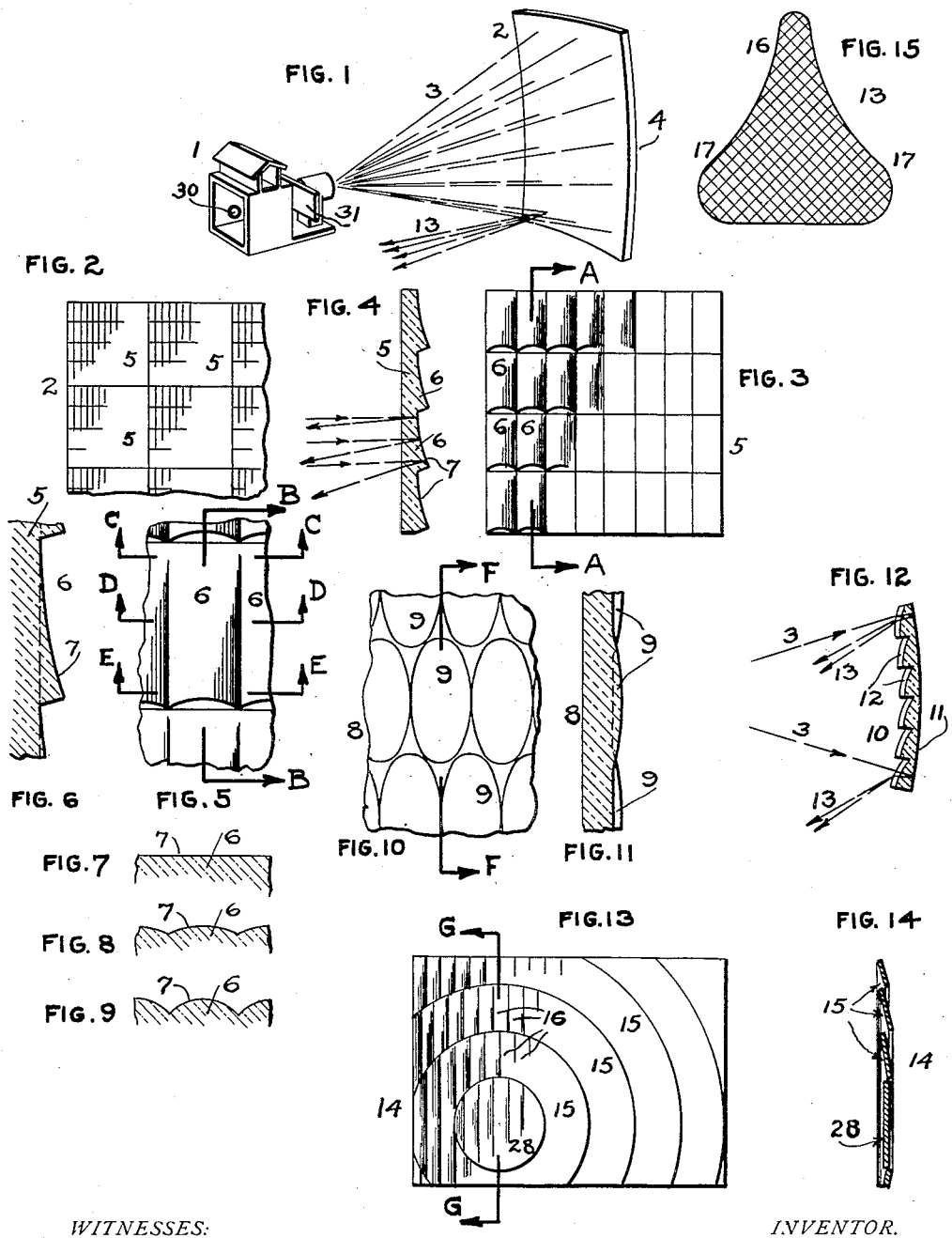

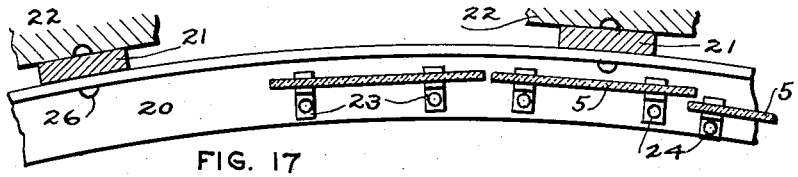
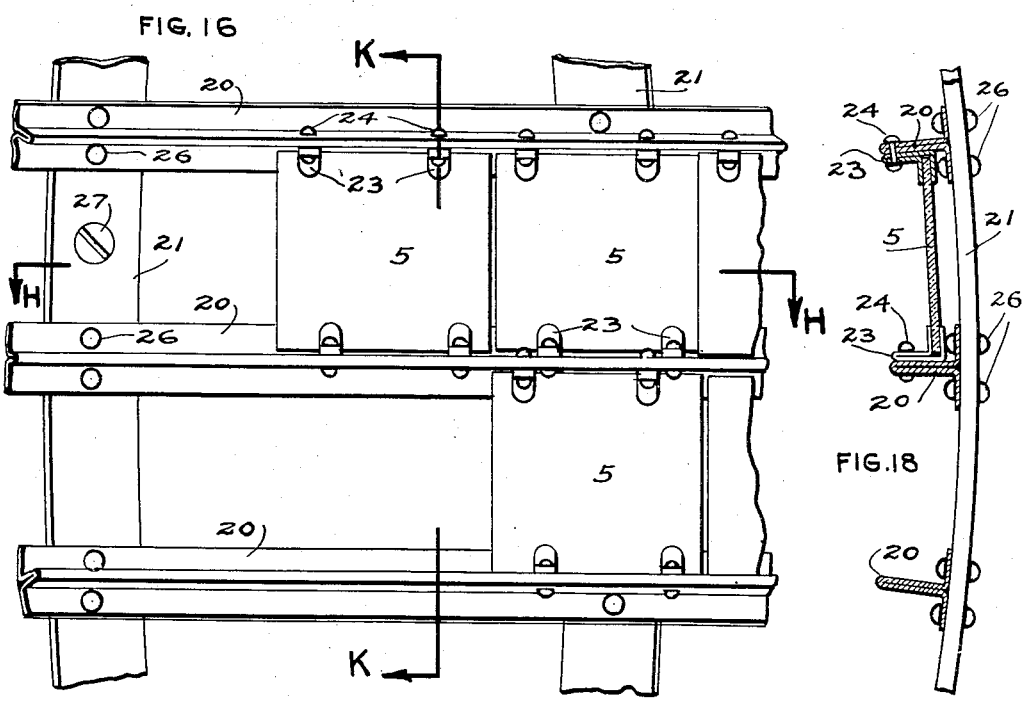

PAUL L. CLARK, OF NEW YORK, N. Y.

MAGIC-LANTERN SCREEN.

1,122,192.  Specification of Letters Patent.  Patented Dec. 22, 1914.

Application filed October 5, 1910. Serial No. 585,532.

*To all whom it may concern:*

Be it known that I, PAUL L. CLARK, a citizen of the United States, residing at Brooklyn, in the city of New York, in the county of Kings and State of New York, have invented new and useful Improvements in Magic-Lantern Screens, of which the following is a specification.

This invention relates to diffusing screens for magic lanterns, stereopticons, or moving picture machines.

One object of the invention is to provide a screen for diffusing, in an improved manner, and in a certain definite direction, the light rays directed upon it by a magic lantern, so that the diffused rays cover a large useful area, and so that the screen, consequently, shall appear luminous to persons within range of the said diffused rays; and in this connection I aim to make the screen of an improved form of prismatic, reflecting glass adapted to give variable horizontal, or sidewise, diffusion at different inclinations to the horizontal plane.

Another object is to provide a screen capable of diffusing simultaneously a plurality of images, each in a different direction, and so that the sharpness of definition of any image is not affected by the other images.

A still further object is to provide a screen of such shape that all portions of images projected thereon may be properly focused upon the screen, and differences in the intensity of the light rays at the center and edges of the said screen reduced to a minimum.

Other special features of the invention are shown in the accompanying specification and drawings, and further pointed out in the claims.

In the drawings:—Figure 1 is a perspective view showing a magic lantern complete with slide, light and lenses, projecting rays of light upon a concave, reflecting, diffusing screen; Fig. 2 is a front elevation showing a plurality of plates, provided with curved reflecting elements arranged to form a large screen; Fig. 3 is an enlarged view, showing the structure of a single plate provided with curved reflecting elements; Fig. 4 is a cross-section of Fig. 3, at A—A; Fig. 5 is an enlarged view of a special form of individual curved reflecting element devised for use in screens located in certain positions; Figs. 6, 7, 8 and 9 are cross-sections of Fig. 5 taken respectively at B—B, C—C, D—D and E—E; Fig. 10 is a back view showing a modified form of individual curved, reflecting elements; Fig. 11 is a cross-section of Fig. 10, taken at F—F; Fig. 12 is a diffusing screen provided with corrugations or prisms upon its concave side; Fig. 13 is a front view of a modified form of diffusing screen made of concentric rings; Fig. 14 is a section at G—G, Fig. 13; Fig. 15 is a cross-section of a beam of light directed from a single element, such as the elements 6, in Fig. 5; Fig. 16 is an enlarged front view of a portion of screen, showing details of the supporting frame for the reflector plates; Figs. 17 and 18 are sectional views of Fig. 16, taken respectively at H—H and K—K; Fig. 19 is a portion of a notched reflector plate.

In the drawings, the same parts appearing in the different views are similarly designated.

In Fig. 1, the magic lantern 1, provided with a luminous source 30, and a plate or slide 31 bearing a transparent picture or device, projects an enlarged image of the said device to the concave glass reflector or screen, 2, having a silvered back 4. The curvature of the concave reflector 2 is such that the rays 3, upon striking it, will, if the screen be perfectly smooth and polished, and without corrugations, be reflected in a parallel, or slightly diverging or converging beam, like the beam from a search-light. It is essential that the magic lantern be positioned at a proper distance from the screen in order to get the desired diffusion of the light rays; moving the magic lantern (from its position when in focus for parallel rays) toward the screen diverges the diffused rays, and moving it from the screen converges the diffused rays. It is not necessary that the axes of the magic lantern and screen coincide, as a substantially parallel arrangement of the diffused rays is obtainable with the lantern moved a short distance off the axis of the screen, as will be understood by persons familiar with optical principles. If the lantern is positioned off the axis of the screen the rays emerging from the said screen, although parallel to each other, will not be parallel to the said axis. A concave, parabolic or spherical screen having a smooth reflecting surface such as the screen 2, above described, would not serve efficiently as a diffusing screen for an image projected upon it by a magic lantern, for the reason that although the rays emerging from the screen may be diverged, and the rays in the image—taken as a unit—diffused, still the rays from all the individual small areas of the projected image are not diffused in such a manner as to render the entire image visable to an observer. In order to diffuse these rays in the desired manner and so that the entire image upon the screen may be visible to observers thereof, I provide a roughened or ribbed surface over substantially the entire area of one side of the said screen, so that light rays coming from a magic lantern and influenced by the improved diffusing screen are scattered in predetermined desirable directions, as will be described at length farther along.

In Fig. 2 a plurality of plates 5, provided with reflecting elements are placed adjacent to each other to form a large concave screen, such as 2, shown in Fig. 1.

In Figs. 3 and 4 it will be seen that the plate 5 has upon its rear surface a plurality of small elements 6, all of the same size and shape and placed closely adjacent to each other, and in orderly arrangement. The surfaces 7 of the elements are silvered, and the light rays entering the plate 5, Fig. 4, are first refracted, pass to the back of the plate, are reflected forwardly toward the front surface and refracted in passing through the said front surface as shown by the arrowed-dash lines. The diffusers 6, being made of clear glass, are, correctly speaking, light-refracting elements, as rays of light are more or less refracted in entering and leaving the transparent structure of the said diffusers, or elements.

In Figs. 5, 6, 7, 8 and 9 it will be noted that the element 6 is flat at the top (where section C—C is taken), and gradually increases in depth and becomes quite rounded at the bottom, as shown in Figs. 6 and 9, the outline of the surface 7 merging by degrees from the plane, flat surface parallel to the general plane of the plate, to the oblique, curved form shown in Fig. 9. The back face 7 is silvered, as already described in connection with Fig. 4. The function of a reflecting element constructed as here shown is to diffuse light rays coming from a magic lantern positioned near, or upon, the axis of the screen, as follows:—Rays striking the upper portion of the element will be diffused in a direction substantially parallel to the axis of the screen; rays striking the middle portion will be diverged slightly sidewise, on account of the reflecting surface 7 being concave at this point (as shown in Fig. 8,) and reflected downwardly; rays striking near the bottom of the element will be diverged sidewise to a considerable extent, and also inclined farther from the axis of the screen than rays reflected by upper portions of the element. The face 7 of the reflecting element 6 is convex at all vertical cross-sections taken perpendicular to the plane of the plate 5, and principally concave at all horizontal cross-sections, as will be understood by reference to the drawings. Reflecting elements of the form here shown are particularly adapted for use in the improved diffusing screen, as each element reflects the beam of light received by it so that, at a short distance in front of the screen, a cross-section through the beam is something of the shape shown in Fig. 15, as will be later described.

In Figs. 10 and 11 the reflecting elements 9 are oval in shape, and shallow and rounded off; adjacent rows are staggered so that the elements themselves shall occupy practically the entire surface of the glass plate 8. Elements constructed as here shown will diverge light rays through a wide angle horizontally and a narrow angle vertically. Either the smooth or beaded side of the plate 8 may be silvered, but diffusion of light rays will not be the same in both cases.

In Fig. 12 the curved screen 10, made of transparent material, receives rays 3 from a magic lantern. The rays enter the screen through the oblique, rounded teeth or prisms 12, which refract them to a reflecting surface 11 on the rear of the screen; the rays are reflected back to the prisms 12, and by them refracted downwardly and sidewise, as shown by the arrowed lines 13. The face 11 may be constructed or treated in any well known manner to cause either total or partial reflection of the light rays influenced by it.

In Figs. 13 and 14 I have shown how the invention can be carried out, by making the screen of a plurality of reflecting members arranged oblique to the axis of the screen, and grouped to form a flat screen 14. The concentric rings 15 are made slightly conical, the inside edge (i. e., the inner circumference) of each ring sets back behind the outer edge of the next adjacent ring. The obliquity of each conical surface is such that the incident rays of light from the magic lantern, striking its surface, would ordinarily be reflected perpendicular to the plane of the screen. For diffusion of light rays elements 16 are provided upon the conical rings. The magic lantern should be in a fixed position in front of the screen, and at a given distance therefrom, to obtain the best results; but by slightly elevating or lowering the said magic lantern, or moving it toward or away from the screen, it is possible, within reasonable limits, to change the direction and divergence of the rays leaving the screen.

In Fig. 15, 13 is a cross-section of a beam of light directed from a single curved element such as shown in Fig. 5; it is noted that the beam is narrow at the top and wide at the bottom. The rays at the top 16 of the beam, being inclined but slightly to the horizontal, and diverging sidewise through a narrow angle, as pointed out in the description of Figs. 5, 6, 7, 8 and 9, are thus diffused in order to attract observers who are at a considerable distance from the screen, and in the path of the narrowly-diverging rays in the beam diffused from the said single curved element. The rays at the bottom 17 of the beam 13 are to be observed by persons near the screen. The intensity of light rays at different parts of the cross-section of the beam 13 may be varied by modifying the proportions of the elements 6, shown in Fig. 5, and it should not be understood that it is always desirable to have the light of uniform intensity upon the entire area of the said cross-section 13.

In Figs. 16, 17 and 18 I have shown a plurality of reflecting plates 5, placed adjacently and held in position by small metal clips 23 securely fastened to the curved, metal, T-shaped, horizontal members 20 by rivets 24. The members 20 are riveted, as shown, to the transverse, curved pieces 21, of flat iron; the pieces 21 are secured with bolts or screws 27 to a rigid backing 22. The general curvature of the assembled metal framework, here shown, is substantially spherical, and forms a stiff support for the reflector plates 5. These plates, when assembled to form a screen, will be oblique to each other, and also to the axis through the center of the screen. The plates may be flat or curved, and of any suitable and convenient size or shape, and may be provided with elements of any desired character, either upon one side or both sides, so arranged as to diffuse directly for observation the light rays comprising the beams delineating the image projected upon them in the most useful direction. Plates of polished, or enameled, metal having a surface composed of properly curved reflecting elements may be substituted for the glass plates if desired.

In Fig. 19, I have shown the plate 5 provided with a notch, or recess, 29 into which is fitted one leg of the metal clip 23. The clip 23, when fitted into the notched plate 5, serves effectually to retain the plate in its proper position in the metal framework shown in Figs. 16, 17 and 18.

A magic lantern diffusing screen such as the one hereinbefore described possesses several distinct advantages over types of screens now in use, among them the following:—

*a.* Images projected upon the improved screen will appear many times more brilliant to an observer than if projected upon a cloth, or painted, screen or a mat surface of any type, such as commonly used, for the reason that the rays from the improved screen are diffused through a limited angle, and the screen resembles, in this respect, a search-light reflector, which, as is well known, concentrates rays of light from a single source into a powerful beam having a certain direction. A screen of familiar types diffuses the rays in images projected upon it in all directions, without regard to efficiency, and it is safe to state that less than 1/100th of the rays diffused by the ordinary screen are practically available for observation, owing to their wide divergence. It is noticeable, in this regard, that a picture projected upon a thin sheet of white cloth is equally visible to an observer either on the light-receiving or reverse side of the screen; such a screen may be viewed from any angle, and the rays from the image projected upon it may be assumed to be equally scattered in all directions; the cloth screen may, therefore, be considered, itself, a luminous source, or a plurality of luminous sources, each small area diffusing, in all directions, the light rays directed upon it by a magic lantern, the reason being that the surface of the cloth comprises an infinite number of reflecting particles, at all angles to each other, and light rays are reflected back and forth between these particles until they emerge from the screen, and many of the rays are lost within the screen structure. It is understood by those versed in the art that the structure of an illuminated mat surface is visible to observers thereof, and that a reflected image of the illuminating source is not produced; it is also known that the structure of an illuminated mirror or any polished surface is invisible, and in the case of an illuminated mirror there is formed in the observer's eye an image of the light source which illuminates the said mirror. A mat surface is said to diffuse or reflect light by irregular or diffuse reflection; a polished surface is said to reflect light by regular or specular reflection. In the improved screen substantially all rays falling thereon are diffused by specular reflection exactly as desired, and the entire image upon the screen is visible to observers in the path of the diffused beam.

*b.* If the screen is provided with shallow elements, and its curvature does not exceed 10 degrees of arc, it is possible, simultaneously, to use a plurality of magic lanterns side by side, each projecting its rays upon the screen, where they are diffused independently, the general direction of the diffused beams composing a complete image from one lantern differing from the direction of the diffused beams composing the images from the other lanterns. The accomplishment of this feature of projection simultaneously of two or more images upon the same screen, without mutual interference in the diffusion of their light rays, may be explained as follows: Consider a magic lantern projecting an image upon the screen; consider also a single, shallow, curved, reflecting element constituting a very small area of the total screen surface. A small beam (or pencil of light rays) from the lantern strikes this small element at a certain angle, and the rays are reflected and diffused through a small solid angle, and in a certain definite direction: by varying the angle of incidence of the small beam with the reflecting surface of said shallow element, it is evident that the angle of emergence of the reflected beam will vary accordingly. The fact that each small curved element reflects the rays received by it through a limited and narrow solid angle, makes it evident that this reflected beam (or, in other words, the pencil of rays which illuminates the said shallow, curved element) is visible only to persons who are in its path; moreover, if the lantern be moved a sufficient distance, either to right or left, of its original position, the direction of the path of the emergent beam will be so changed that the observer will be unable to see any of the reflected rays comprising said beam, and, consequently, the said curved element will appear dark and non-luminous. The foregoing description of the functions and behavior of a single curved reflecting element applies also to all the elements upon a screen of parabolic or spherical shape, like that shown in Fig. 1, and also to the modification illustrated in Figs. 13 and 14, for the reason that all the elements are positioned at such angles with relation to the rays of light incident upon their surfaces that the beams reflected from, and diffused by, them are in the same general direction; if the screen were smooth and polished, and devoid of corrugations, the divergence (or convergence) of the reflected rays would be the same as from a parabolic mirror, such as used for search-lights. It should be understood that these corrugations, or curved elements, are employed for the purpose of dispersing (or diffusing) small, separate and closely adjacent parts of the beam comprising the image projected upon the screen by the magic lantern, and the angle of diffusion from any small, elementary area of the entire screen is substantially the same as from any other small, elementary area: the diffusion from the entire screen, as a unit, is in the same general direction and (when the magic lantern is at, or near, the principal focus of and focused upon the screen) through substantially the same solid angle as from a single curved element. It is evident that an observer may be so close to the screen as to be in the path of light rays reflected from only a very small number of the shallow, curved mirrors; but, by increasing the distance between himself and the screen, he is enabled to catch the reflected light from a greater and greater number of these mirrors, until at a certain distance, and in a certain position, he catches the light reflected from each and every one of the said curved elements, and, consequently, can discern a complete image upon the said screen. Now, if two magic lanterns be positioned in front of the screen, at about equal distances therefrom, and at such an angle thereto that their optical axes intersect each other at a common point near the center of the screen, and sufficiently far apart so that the angle formed between the aforesaid optical axes is equal to or greater than the angle of divergence of one of the individual curved mirrors, then the diffused rays comprising the images projected by the two magic-lanterns do not conflict, and observers in the proper line of sight, and in the path of the diffused rays from the screen, will see one, and only one, image. This form of the invention will be found useful in cases in which it is expedient to position the screen at the intersection of several streets, so that it may diffuse the plurality of images projected upon it, each in its proper direction along the said streets. The screen may be located upon the roof of a building, if desired, and the magic lantern, or moving-picture machine, set up in a building across the street, or at any convenient place.

c. It is well known that if a magic lantern be focused to give a distinct image upon the center of a plane screen the outer portions of the image are blurred and indistinct on account of the aberration of the lenses in the magic lantern. The concave screen, above described, may be of such shape and curvature as to permit securing a clear image over its entire surface. It is also true that in a plane diffusing screen the light intensity near the edges is less than at the center of the screen, on account of the respective distances of the different parts of the plane screen from the source of illumination. In the improved diffusing screen this defect is partly remedied, as all parts of its surface are more nearly at equal distance from the magic lantern.

In all the preferred modifications of the improved screen the reflecting elements are oblique to the axis of the said screen which passes through its center; and the plates, upon which are molded the curved elements, are oblique to each other.

It is obvious that each of the reflecting elements upon the plates is a curved mirror diffusing the rays received by it in a predetermined direction, and through a predetermined solid angle.

On account of substantially all rays from the magic lantern striking the screen oblique to the surface thereof, the diffusion of light from the individual reflecting elements will not be absolutely the same as if said rays struck each screen plate normal to its surface. Ordinarily, however, the screen would embrace less than 10 degrees of arc, and if the reflecting elements composing the screen plates are shallow, the error in diffusion due to curvature of the said screen (or to the obliquity of said screen plates) will be negligible; in screens of considerable curvature the error may, in a measure, be rectified by varying the relative positions of the magic lantern and its screen. The screen need not be positioned, in all cases, so as to be vertical, as it is apparent that in order to obtain the desired general inclination of the diffused rays it will sometimes be necessary to tip the said screen, as a unit.

By virtue of the powerfully concentrating effects, and high efficiency, of the improved screen, it is feasible to construct screens having much greater area than those heretofore produced, and, at the same time, to illuminate them with magic lanterns or moving-picture machines provided with illuminating means of less candle-power than is at present required. If the illuminating means is of high candle-power the images projected upon the screens will appear intensely brilliant, and, where colored slides or films are used, very striking and pleasing results will be obtained; and, in this connection, it may be said that the screens may be employed for advertising purposes, and used in connection with electric signs.

Where large screens are used best results will be obtained with the magic lantern positioned at a sufficient distance from the said screens to cause a convergence in the general direction of the rays reflected therefrom.

I know that concave reflectors adapted to receive and diffuse light rays emanating from a single source of light are in use; and that concave, reflecting signs of parabolic or spherical shape and provided with corrugated letters illuminated from a single source of light, placed near the focus of the sign, have been used before; and I am, therefore, claiming neither a concave reflector nor means for illuminating reflecting letters or pictures supported upon a concave background: but

What I claim as new and desire to secure by Letters Patent of the United States, is:—

1. A screen, for displaying projected images, comprising a plurality of plates, each of said plates being provided with a plurality of specularly reflecting elements curved in more than one direction, and means for supporting said plates adjacent to each other and oblique to the axis of the screen.

2. A screen, for displaying projected images, comprising a plurality of small, specularly reflecting elements curved in more than one direction.

3. A screen, for displaying projected images, comprising a plurality of small, curved, reflecting elements, each of said elements being flat at one end and, thence, of variably and gradually increasing depth.

4. The method of presenting views projected upon a screen which consists in uniformly distributing by specular dispersion throughout the desired viewing angle, the rays of each pencil of light projected upon the screen; substantially as described.

5. A screen, for displaying projected images, comprising a plurality of reflecting elements, each of said elements being curved in transverse section and of gradually and variably increasing depth from one end to the other end thereof.

6. The method of conserving light reflected from a plane to which it has been projected by a lantern, which consists in distributing by specular dispersion throughout the desired viewing angle only, the rays of each of the pencils of the projected light; substantially as described.

7. A screen, for displaying projected images, having a specularly reflecting, light diffusing surface composed of a plurality of closely adjacent, shallow elements, said elements being curved in more than one direction.

8. A screen, for displaying projected images, comprising a plurality of small, specularly reflecting elements curved in more than one direction, said elements being arranged closely adjacent to each other and oblique to the axis of the screen.

9. A screen, for displaying projected images, comprising a plurality of small, specularly reflecting elements curved in more than one direction, said elements being arranged closely adjacent and oblique to each other, and oblique, also, to the axis of the screen.

10. A projection screen provided with a surface composed of small juxtaposed curved specular surfaces, substantially as described.

11. A projection screen provided with a surface composed of small curved specular surfaces having conjunctive polygonal peripheries, substantially as described.

12. A projection screen having a specular surface made up of small juxtaposed areas, each of which is given a suitable curvature to effect a substantially even divergence of the rays of a pencil of light projected there-upon throughout the desired viewing angle, substantially as described.

13. A projection screen having a surface made up of relatively small juxtaposed specular surfaces, each of said juxtaposed surfaces having a curvature suitable to reflect the rays of an incident pencil of projected light and evenly distribute said rays throughout the desired viewing angle; substantially as described.

In witness whereof, I have hereunto set my hand this 3rd day of October, 1910.

PAUL L. CLARK.

Witnesses:
 Geo. Smith,
 Albert Cooper.